No. 789,934. PATENTED MAY 16, 1905.
W. T. PERCIVAL.
SEAL LOCK.
APPLICATION FILED OCT. 8, 1903.

Witnesses
Percy Newell
M. Handrick

Inventor
William T. Percival
by Fred Walsh
Attorney

No. 789,934.                                                        Patented May 16, 1905.

UNITED STATES PATENT OFFICE.

WILLIAM THOMAS PERCIVAL, OF PENSHURST, NEW SOUTH WALES, AUSTRALIA, ASSIGNOR TO JAMES CHANNON, OF PAKENHAM, HORNSBY, NEAR SYDNEY, NEW SOUTH WALES, AUSTRALIA.

SEAL-LOCK.

SPECIFICATION forming part of Letters Patent No. 789,934, dated May 16, 1905.

Application filed October 8, 1903. Serial No. 176,205.

*To all whom it may concern:*

Be it known that I, WILLIAM THOMAS PERCIVAL, engineer, a subject of the King of Great Britain, and a resident of Basset street, Penshurst, near Sydney, in the State of New South Wales and Commonwealth of Australia, have invented new and useful Improvements in Seal-Locks Specially Applicable for Strap-Buckles, as of Mail-Bags, of which the following is a specification.

This invention refers to seal-locks specially devised for use on mail-bags, though useful to prevent unauthorized access to any fastening or other things, and it has been specially devised in order to construct such a lock having a sliding bolt with a secure locking device unassisted by any mechanical spring and having no protruding parts; but in order that this invention may be clearly understood reference will now be made to the drawings herewith, in which—

Figure 1:
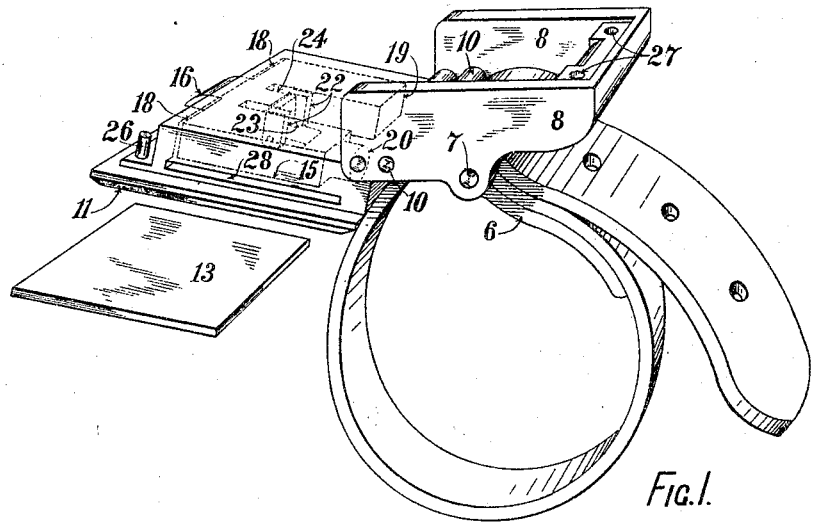
Figure 2:
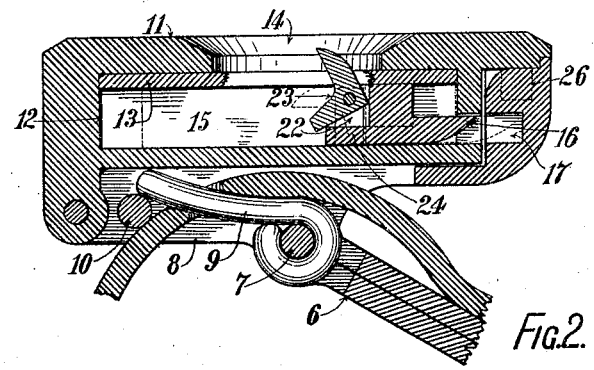
Figure 3:
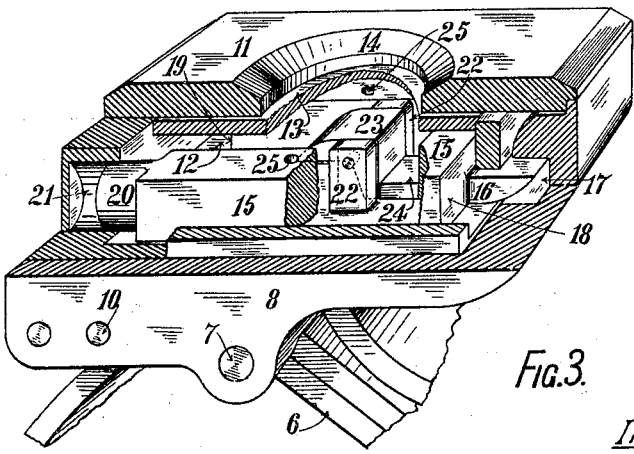

Figure 1 is a perspective view of a seal-lock constructed according to these present improvements. Fig. 2 is a longitudinal sectional elevation of the same unsealed and ready to be disengaged, and Fig. 3 is a perspective sectional view of the same locked and sealed.

The strap, as ordinarily, has end 6 sewed or otherwise fastened to chape 7, which joins the sides 8 of the lock casing or box and is the pivot of the tongue 9, which takes on restbar 10. The buckle or lock-box has a hinged leaf or cover 11. Within this cover 11 is a chamber 12, adapted to receive the seal 13 of the lock, so as to form a ceiling or top for the sliding bolt 15. The seal 13 is composed of strawboard or cardboard of sufficient thickness that it may be centrally bulged under pressure and will recover its original shape and retain such shape, or this seal may be composed of wood veneer or easily-destructible metal or other flat material having the same quality. The sliding bolt 15 fills the chamber 12 under the seal 13, which chamber forms a guide for the said bolt 15. The forward end 16 of said bolt 15 is a latch end or has a round nosing or taper and is adapted to take in a socket or housing 17 on the end of the lock-casing. This bolt 15 has movement longitudinally which is governed by its shoulders 18 and 19. The back end of this bolt 15 is slotted and has a guide-piece 20 in a housing 21 in the back of the cover 11. Pivoted to lugs or ears 22 in the chamber 12 and within this slot of the bolt 15 is a lever-piece or trigger 23, whose lower member takes on the end 24 of the slot of bolt 15, so that it will give motion to said bolt 15 or act as a stop against its backward movement. The upper member of this trigger 23 is adapted to fit comfortably, though hardly pressed, under the seal 13 when the bolt 15 is in its forward position in the housing 17. As the bolt 15 is pushed backwardly by the contact of the latch or nosing 16 with the corresponding nosing of the housing 17 on the closing of the cover 11 onto the lock-casing the lower member of the trigger 23 is forced backward by end 24 of the bolt-slot and the upper member bulges or forces the seal 13 centrally upward for the moment. The recovery of said seal 13 to its normal position then forces the bolt end 16 into its housing 17, and it is retained or sealed there until the seal 13 is destroyed and the bolt 15 withdrawn.

The cover 11 has an orifice 14 for revealing markings on the seal 13 and through which a hook may be inserted into one or other of holes 25 to withdraw the bolt. The pintles 26 on the cover 11 fitting sockets 27 in the casing prevent the withdrawal of said cover by the removal of the hinge-pin.

In use, the bolt 15 being drawn outwardly from the hinge end, the seal 13, having the quality before mentioned, is inserted through the opening 28 in the side of the chamber 12, fitting comfortably over the sliding bolt 15. When it is desired to lock and seal the fastening, the cover 11 is shut down and the bolt is forced inwardly by its end 16 contacting with the housing 17. The trigger 23 by this force is caused to bulge that part of said seal 13 just above its upper member until the bolt 15 is opposite its socket 17, into which it is shot by the return of the seal to its normal position and retained therein by the stiffness of said seal, and the lock is thus secured or sealed until the seal 13 is destroyed. The seal is destroyed by an appropriate tool through the orifice 14, and this in the form of a hook-bar is inserted into a hole 25 to withdraw the bolt, and so release the lock.

Having now particularly described and ascertained the nature of my said invention and in what manner the same is to be performed, I declare that what I claim is—

1. In combination with the frame of a seal-lock, of a bolt therein, and a flexible seal which acts as a spring to seat the bolt, substantially as set forth.

2. In a seal-lock, the combination with a frame having a recess therein, of a bolt within the recess, and a flexible seal covering the recess and serving as a spring to seat the bolt, substantially as set forth.

3. In a seal-lock, the combination with a frame having a recess therein, of a bolt within the recess, a dog engaging with the bolt, and a flexible seal covering the recess and engaging with the dog, serving to seat the bolt, substantially as set forth.

4. In a seal-lock, the combination with two parts hinged together and a bolt for securing the parts in engagement, of the pintles 26 carried by one of the parts, engaging within sockets in the other, and a flexible seal for sealing the bolt, substantially as set forth.

5. In a seal-lock, the combination with a chamber 12 adapted to receive an easily-destroyable resilient seal 13 to form its ceiling or top, of a bolt 15, a pivoted lever-piece or trigger 23 adapted to be actuated by movement of said bolt against the force or stiffness of said seal and to shoot and retain by means of said force or stiffness the bolt in the locked position, substantially as set forth.

In testimony whereof I have signed my name to this specification in the presence of two subscribing witnesses.

WILLIAM THOMAS PERCIVAL.

Witnesses:
PERCY NEWELL,
M. J. CANDRICK.